(12) United States Patent
Boca et al.

(10) Patent No.: US 10,427,300 B2
(45) Date of Patent: Oct. 1, 2019

(54) ROBOT PROGRAM GENERATION FOR ROBOTIC PROCESSES

(71) Applicant: ABB Schweiz AG, Baden (CH)

(72) Inventors: Remus Boca, Simsbury, CT (US); Srinivas Nidamarthi, Auburn Hills, MI (US)

(73) Assignee: ABB Schweiz AG, Baden (CH)

( * ) Notice: Subject to any disclaimer, the term of this patent is extended or adjusted under 35 U.S.C. 154(b) by 476 days.

(21) Appl. No.: 14/650,112

(22) PCT Filed: Dec. 6, 2013

(86) PCT No.: PCT/US2013/073463
§ 371 (c)(1),
(2) Date: Jun. 5, 2015

(87) PCT Pub. No.: WO2014/093144
PCT Pub. Date: Jun. 19, 2014

(65) Prior Publication Data
US 2015/0328773 A1 Nov. 19, 2015

Related U.S. Application Data

(60) Provisional application No. 61/735,300, filed on Dec. 10, 2012.

(51) Int. Cl.
*B25J 9/16* (2006.01)
(52) U.S. Cl.
CPC ............ *B25J 9/1664* (2013.01); *B25J 9/1671* (2013.01); *G05B 2219/36248* (2013.01);
(Continued)

(58) Field of Classification Search
None
See application file for complete search history.

(56) References Cited

U.S. PATENT DOCUMENTS 5,429,682 A * 7/1995 Harlow, Jr. ............. B05B 12/02
118/316
6,292,715 B1 * 9/2001 Rongo .................... B25J 9/1664
318/568.1
(Continued)

FOREIGN PATENT DOCUMENTS

WO WO 2010091086 A1 * 8/2010 ............ B25J 9/1664

OTHER PUBLICATIONS

Suk-Hwan Suh, Jung-Jae Lee, Yong-Jong Choi, Sung-Kwon Lee, "Prototype integrated robotic painting system: software and hardware development", IEEEXplore, pp. 475-483 (Jul. 26-30, 1993).*
(Continued)

*Primary Examiner* — Jason Lin
(74) *Attorney, Agent, or Firm* — Taft Stettinius & Hollister LLP; J. Bruce Schelkopf (57) ABSTRACT

A system for generating a path to be followed by a robot used to perform a process on a workpiece has a computing device that has program code for operating the robot and obtaining information related to the workpiece and a vision system that scans the workpiece to obtain images thereof that are provided to the computing device. The computing device processes the images to obtain geometric information about the workpiece that the computing device uses in combination with process related reference parameters stored in the computing device to generate program code for a path to be followed by the robot to perform the process on the workpiece. The computing device also includes code configured to verify for quality the generated program code for the path to be followed by the robot to perform the process on the workpiece.

8 Claims, 7 Drawing Sheets

(52) U.S. Cl.
CPC ............. *G05B 2219/36504* (2013.01); *G05B 2219/40425* (2013.01); *G05B 2219/40515* (2013.01); *G05B 2219/45065* (2013.01); *Y10S 901/02* (2013.01); *Y10S 901/47* (2013.01)

(56) References Cited

U.S. PATENT DOCUMENTS

| | | | | |
|---|---|---|---|---|
| 6,445,964 | B1* | 9/2002 | White | B25J 9/1689 700/253 |
| 2002/0120359 | A1* | 8/2002 | Xi | G05B 19/4097 700/184 |
| 2006/0233945 | A1* | 10/2006 | Calvetto | B05B 12/122 427/8 |
| 2011/0282492 | A1* | 11/2011 | Krause | B25J 9/1664 700/259 |
| 2012/0089246 | A1* | 4/2012 | Mitani | G05B 19/4097 700/159 |
| 2012/0156362 | A1* | 6/2012 | Sadovoy | B05B 12/084 427/9 |

OTHER PUBLICATIONS

Suh et al., "A prototype Integrated Robotic Painting System: Software and Hardware Development", Jan. 1993, Journal of Manufacturing Systems, vol. 12, No. 6, pp. 475-482 (Year: 1993).*

* cited by examiner

ROBOT PROGRAM GENERATION FOR ROBOTIC PROCESSES

1. FIELD OF THE INVENTION

The present invention relates to industrial robots and more particularly to the generation of the program that when executed causes the robot to perform processes on an article of manufacture.

2. DESCRIPTION OF THE PRIOR ART

Industrial robots are being used in complex applications. The complexity of the application comes from the geometry of the parts and the process that the robot has to execute on the parts.

An industrial robot is an automatically controlled, reprogrammable, multipurpose manipulator programmable in three or more axes. Examples of industrial robots are a robot located at a fixed position which is mobile by itself or mobile because the robot is mounted on a device that it is itself mobile such as a motorized vehicle or mounted on a track or gantry etc.

Vision systems have been used to determine the geometry of the part and automatically generate a robot path. Because these methods do not use part geometry together with process information to automatically generate the robot program, the robot program has to be manually updated after the path generation.

SUMMARY OF THE INVENTION

A system for generating a path to be followed by a robot when the robot is to perform a process on a workpiece comprises:

a computing device having therein program code for operating the robot and obtaining information related to the workpiece; and a vision system for scanning the workpiece to obtain images thereof, the images provided to the computing device, the computing device processing the images to obtain geometric information about the workpiece that the computing device can use in combination with process related reference parameters stored in the computing device to generate program code for a path to be followed by the robot to perform the process on the workpiece.

A system for generating a path to be followed by a robot when the robot is to perform a process on a workpiece comprises:

a computing device having therein program code for operating the robot and obtaining information related to the workpiece; and a vision system for scanning the workpiece to obtain images thereof, the images provided to the computing device, the computing device processing the images to obtain geometric information about the workpiece that the computing device can use in combination with process related reference parameters stored in the computing device to generate program code for a path to be followed by the robot to perform the process on the workpiece, the program code including motion instructions to be followed by the robot to perform the process on the workpiece, the computing device optimizing the program code for the path and motion instructions to be followed by the robot to perform the process on the workpiece.

A system for generating a path to be followed by a robot when the robot is to perform a process on a workpiece comprises:

a computing device having therein program code for operating the robot and obtaining information related to the workpiece; and a vision system for scanning the workpiece to obtain images thereof, the images provided to the computing device, the computing device processing the images to obtain geometric information about the workpiece that the computing device can use in combination with a process template stored in the computing device to generate program code for a path to be followed by the robot to perform the process on the workpiece, the program code including selected motion instructions to be followed by the robot to perform the process on the workpiece, the computing device optimizing the program code for the path and the selected motion instructions to be followed by the robot to perform the process on the workpiece.

DETAILED DESCRIPTION

A robotic system for painting a transformer is used as the example in the description of the present method and apparatus. The transformer is the object or part to be painted, that is, to have work performed on it, by the robotic system.

The method and apparatus described herein can also be used for any other robotic process where the robot path and robot process program is generated and optimized automatically such as polishing, deburring, cleaning, spraying, dispensing, sanding, grinding, milling, inspection, 3D geometry generation, machining, etc. These are processes where usually the robot handles a part or a tool and other fixture(s) or the robot executes the process on the part.

Each process has its own specific parameters. Some of the parameters are pre-known and others are taught. The taught parameters are generated automatically based on the scanned geometry of the part or scene and the pre-known process parameters.

Figure 1:
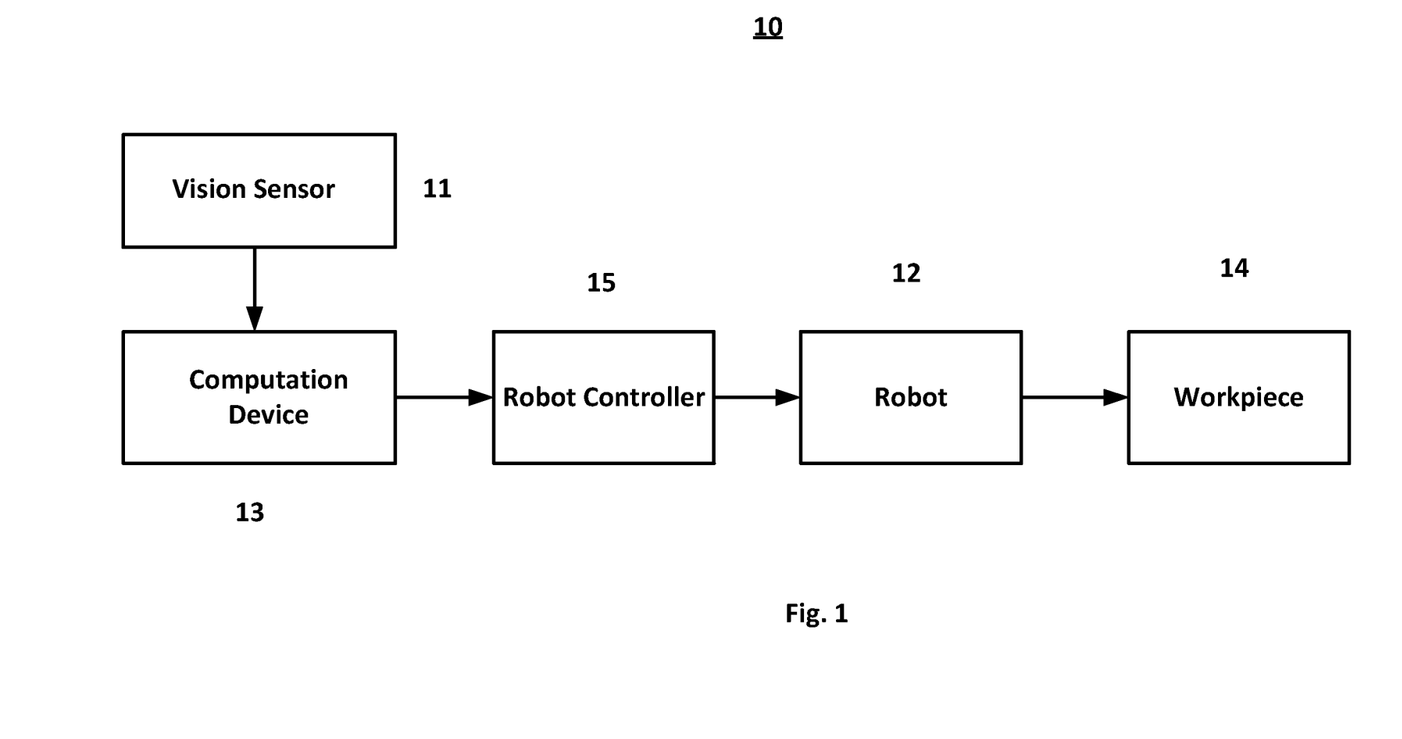
FIG. 1 shows a block diagram for a robot system for scanning and painting an article of manufacture such as a transformer.
Figure 3:
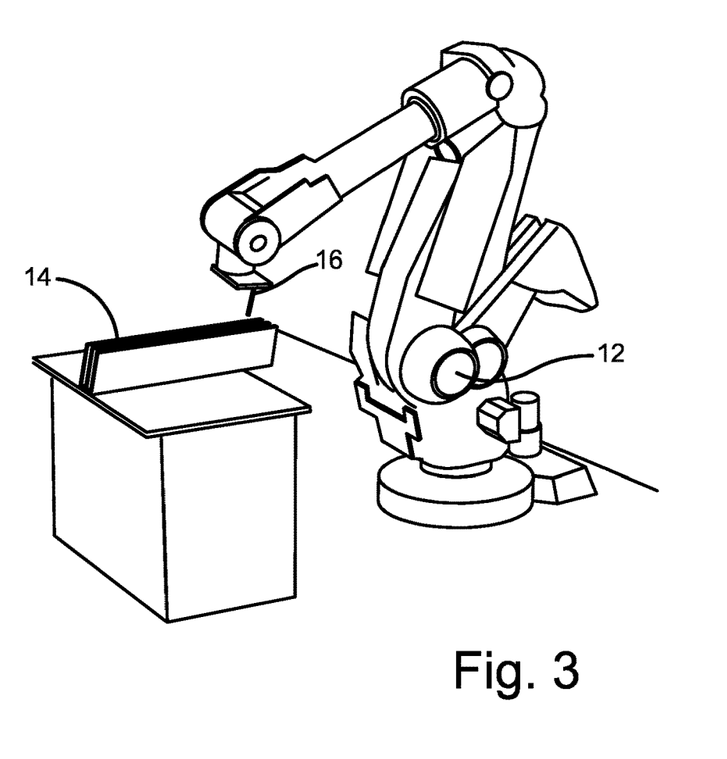
FIG. 3 shows the robot, the transformer cooling fins that are to be painted by the robot and the paint gun.

Referring now to FIG. 1, there is shown a block diagram for a robot system 10 with an industrial robot 12 which is used to scan and paint a workpiece 14 that is the transformer shown in FIG. 3. The robot 12 is an automatic machine with 'n' number of degrees of freedom.

System 10 also includes a vision sensor 11, a computation device 13 and a robot controller 15. The vision sensor 11 and computation device 13 can be in the same housing if sensor 11 is a smart sensor. The program to operate the robot is in robot controller 15.

Figure 2:
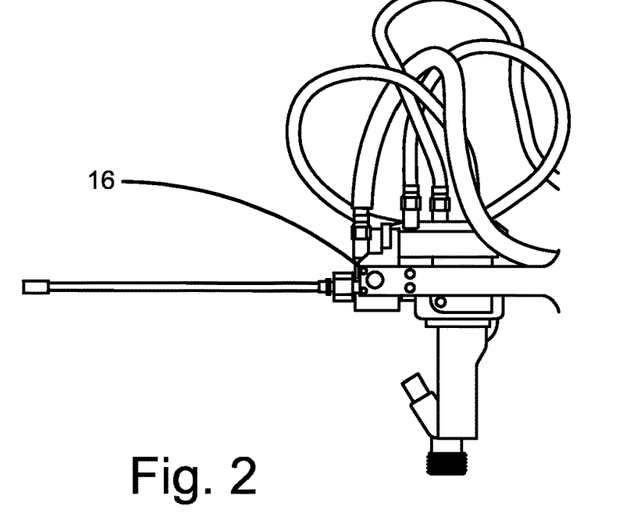
FIG. 2 shows the paint gun.

As is shown in FIG. 3, a paint gun 16 is mounted on the robot 12. The paint gun 16 is shown in more detail in FIG. 2. The paint gun 16 is process equipment. Other examples of process equipment that can be mounted on the robot depend on the work to be performed by the robot and can include a cleaning nozzle, sanding plates, milling tool, etc.

FIG. 3 shows only a single robot for a painting a workpiece also sometimes referred to herein as a part, that is, the transformer 14. It should be appreciated that the robot 12 can hold the part 14 on which the work is be performed and the process equipment or tool, in this embodiment the paint gun 16, is held by a fixture. It should also be appreciated that two or more robots can work together for a specific process and there are numerous other variations depending on the specific process that is to be performed.

In the present method, the surface of the transformer 14 is scanned by one or more 3D cameras which are the vision sensor 11 of FIG. 1. The cameras can either be mounted on the robot 12; or static mounted; or mounted on robot 12 and static mounted. In a preferred embodiment, there is only one camera mounted on the robot 12. Further any combination of sensors, for example 2D or 3D camera and other sensors such as accelerometers or magnetometers etc., can be used if the output of the processing is 3D data about the scanned part/scene.

Geometric and other visual information is extracted from the scanning by the 3D camera and also from the other sensors if those sensors are used. The parameters of the process, which in this example is painting, are generated.

For this example, the parameters can be paint hose (the diameter of the paint gun 16 through which the paint is sprayed), paint flow and the distance from the gun 16 to the surface or face of the part 14 to be painted. The paint hose and the distance of the gun 16 to the part 14 affect the area that is sprayed. Knowing these two parameters (hose/diameter and distance) a robot path pattern to paint the scanned surface or part 14 can be generated.

After the path is generated, a check is performed for the quality of the path. The path quality check can for example check for collisions. If the path quality is met, then the generated program (that includes the robot path and process information) is sent to a computing machine such as the robot controller 15 or a PC which is not shown in either FIGS. 1 and 3 either for execution, that is, the scanned and processed surface (face) of part 14 is painted, or if the part 14 has different faces the robot 12 moves to the next surface on the part 14 that is to be scanned and processed. A part 14 can have different faces and all of those faces can be scanned before any of them are painted or they each can be painted after each surface is scanned and processed.

For painting, it is desirable to scan all of the surfaces of the part 14 to be painted before the robot 12 executes the path and paints all of the surfaces. For other applications, each surface may be scanned and have worked performed on it before the next surface is scanned and worked on.

Figure 4:
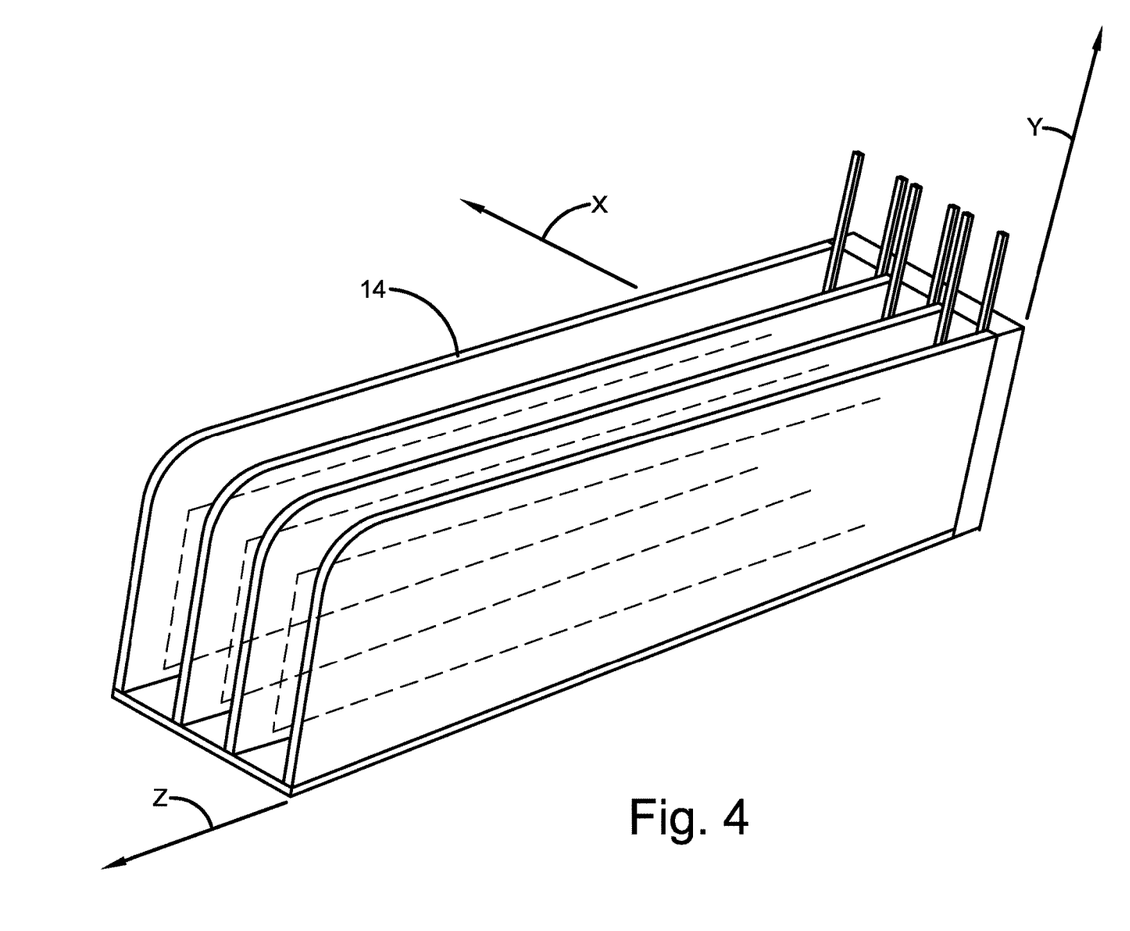
FIG. 4 shows the transformer cooling fins that were scanned by the robot system.

The description herein is for a painting process for a part 14 to be painted that as is shown in FIGS. 3 and 4 are the cooling fins of a transformer. Since this is for a painting process each face of the transformer fins 14 is scanned separately from the other faces that are on the transformer fins 14 and the painting occurs only after all of the faces are scanned and the images from these scans are processed.

FIG. 4 shows the transformer cooling fins 14 that are scanned by the camera. The lines in FIG. 4 marked as X, Y and Z are the coordinate frame. The transformer cooling fins 14 are recognized and located with computer vision techniques such as 3D segmentation, 3D planar fitting, 3D clustering, 3D grouping and sorting.

The end result, as described below in more detail, of processing the images of the transformer cooling fins 14 acquired from the scan is the generation of the path that the robot 12 follows to paint the cooling fins 14 with the paint gun 16. The 3D scan is used to calculate the geometric elements for the cooling fins 14 such as width, height, the distances between the fins 14 and the normal directions to the fins 14. The geometric information together with the pre-known process parameters are used to generate the robot program for the path for painting above and in between fins 14.

Figure 5:
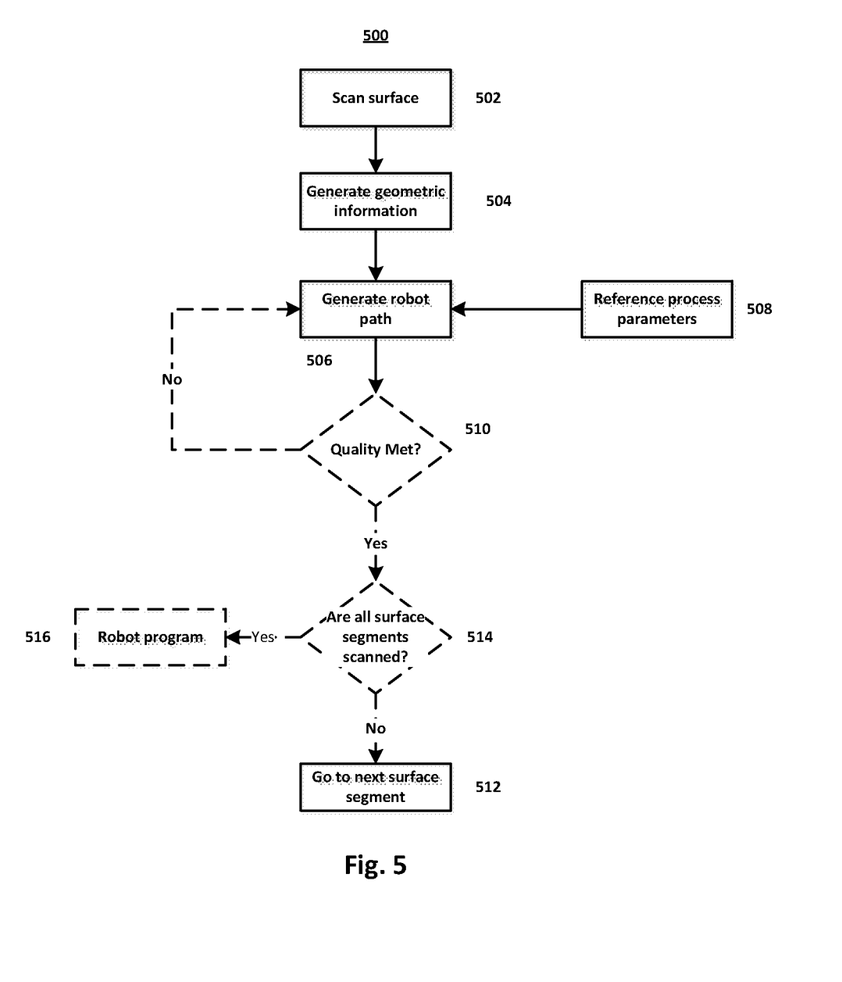
FIG. 5 shows a flowchart for one embodiment of a method for scanning the transformer cooling fins and generating the path to be followed by the robot when it paints the transformer cooling fins.

One embodiment of a method for scanning the transformer and generating the path to be followed by the robot when it paints the transformer cooling fins 14 is shown by the flowchart 500 in FIG. 5. As is shown in FIG. 5, the first step 502 in flowchart 500 is the scanning the surface of the part 14 that will have work performed on it by the robot 12. The scanning is accomplished by moving the 3D camera around the part 14 and acquiring 3D images. The images are processed together by using either:

computer vision techniques that use well-known computer vision algorithms such as 3D feature extraction, matching, registrations; or the known calibration from the camera to the robot and robot positions and then referencing all of the images in the same coordinate frame.

The result of the scanning is the surface of the scanned area. The surface in the simplest form is a 3D point cloud.

In the next step 504, geometric information of interest for the scanned surface area is generated such as: a) extracting 3D geometric primitives from the surface as planes, corners, cylinders, cones, etc.; and b) extracting other geometric information of interest such as: distances between geometric entities, normals/directions, etc.

Using the information from steps 502 and 504 a computing machine such as the robot controller 15 shown in FIG. 1 or a PC, etc. generates at step 506 the robot path program using the reference process parameters shown symbolically as 508. For painting these parameters are when to switch on paint flow, paint spray pattern, speed of robot motion, etc. The parameters are stored in the computing machine.

The generated robot program is optionally verified at query 510 for quality. For example, is the entire path reachable and collision free and for painting can the right amount of paint material be deposited on the part 14 to be painted. If at optional step 510 the quality is not met for the robot program, then the robot program is re-generated again at 506 considering the information provided by the quality verification.

If at the optional verification step 510 the quality is met for the robot program, then for the painting process described herein the method proceeds to step 512 wherein the method is repeated to scan the next surface segment of the part 14 to be painted. For painting, it is desirable to scan all of the surfaces of the part to be painted before the robot 12 executes the path and paints all of the surfaces. For other applications, each surface may be scanned and have worked performed on it before the next surface is scanned and worked on.

As shown in this figure there is a decision block 514 before block 512 that asks "Are all surface segments scanned?" If the answer is no, then the method proceeds to step 512. If the answer is yes, then as shown by block 516 the robot program is used to operate the robot 12 to paint part 14.

The paths for each surface segment to be painted are stored on the robot controller 15 or on the PC before they are sent to the robot for execution. This allows, for example, the speed of the paint tool 16 along a narrow corner to be optimized so that the surface of the corner is not over-deposited with paint when the robot executes the path.

Figure 6:
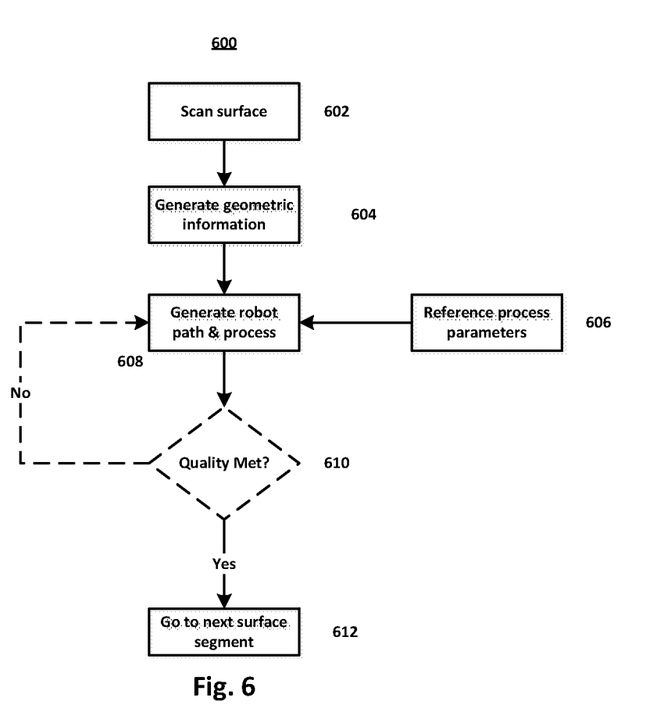
FIGS. 6 to 8 show alternate embodiments for the scanning and path generating method shown in the flowchart of FIG. 5.
Figure 7:
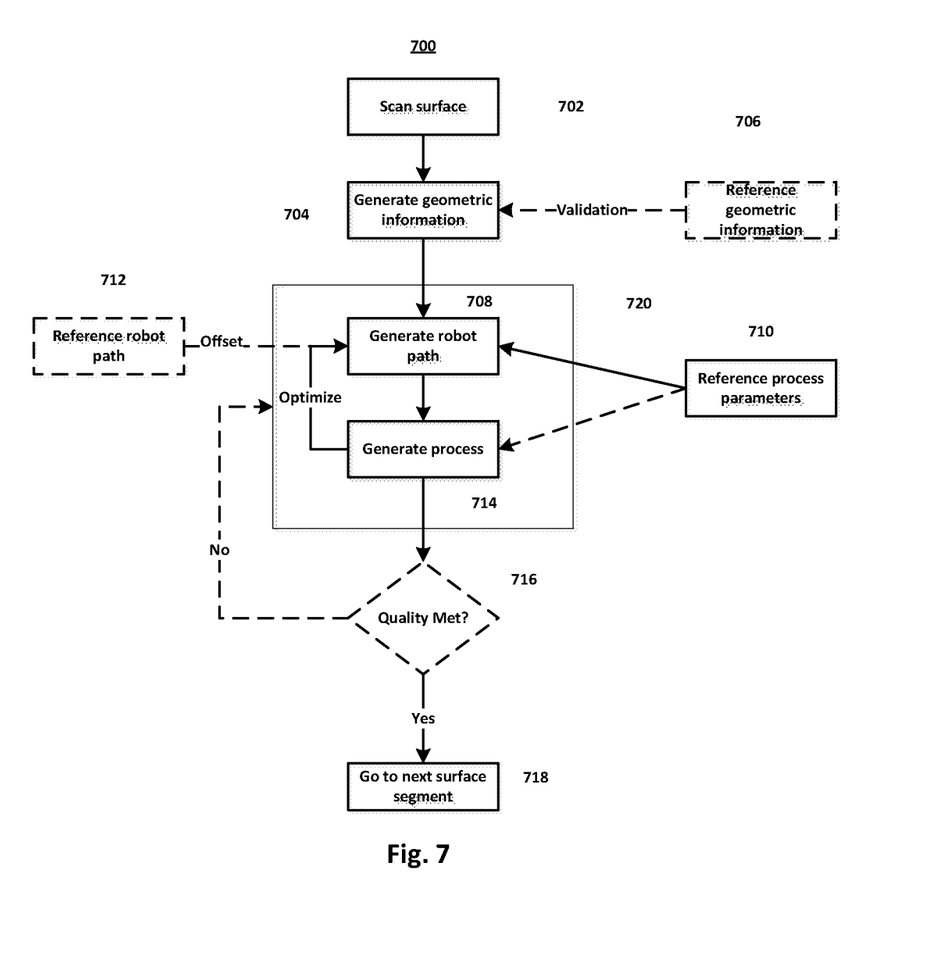
Figure 8:
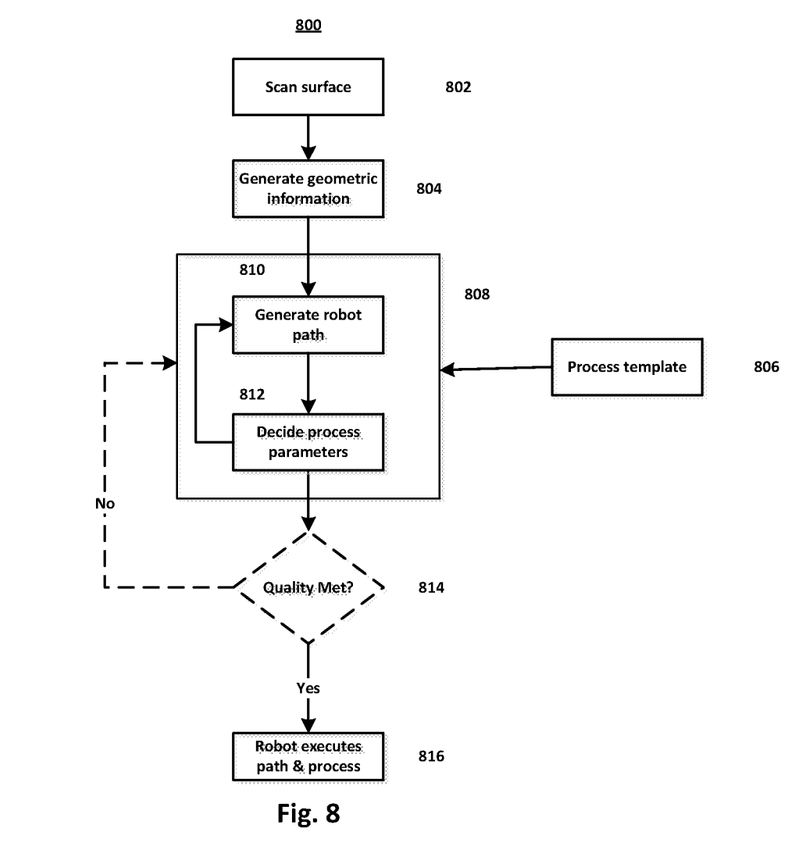

As is described below, there can be, as is shown in FIGS. 6, 7 and 8, variations for some or all of the steps in FIG. 5.

The steps 602 to 610 of the method 600 shown in the flowchart in FIG. 6 are identical to the steps 502 to 510 with the exception that the process instructions are at step 608 generated along with the generation of the motion instructions for the robot path. For example, such instructions can be start and stop paint equipment, set paint flow speeds, or for other processes, contact forces range, speed for robot and external axes etc. While not shown in FIG. 6 for ease of illustration, there can be in the method 600 two blocks that are identical in function to blocks 514 and 516 described above.

The flowchart of FIG. 7 for the method 700 has a scan surface step 702 that is identical to the steps 502 and 602 of FIGS. 5 and 6. After executing step 702, the method proceeds to the step 704 wherein the generated geometric information for the scanned surface can be validated by comparing the scanned information with the reference geometric information in block 706 which may not be available. Since the reference geometric information may not be available, block 706 and the use of the reference geometric information for validation are both shown in FIG. 7 by dotted lines.

The reference geometric information if available is used mostly in correlation with an existing reference robot path. If the reference geometric information doesn't exist, then the method 700 is identical to the methods 500 and 600 in FIGS. 5 and 6 up to step 704.

The validation in step 704 if performed is used to ensure that the surface that was scanned is the surface that should have been scanned and to determine if the geometric information generated from the scan correlates with the reference geometric information for that surface. The surface difference can be used further down the flow 700 in generating the robot path.

The next step 708 generates the robot path using the geometric information generated in step 704 and the reference process parameters 710. The robot path 708 and process information 714 are generated only for the surface difference as the reference geometric information and reference robot path form a pair. If the surface that was scanned is the surface that should have been scanned, then only the process information is generated at step 714 as the robot path already exists. In this case, the generate robot path step 708 is a copy function.

FIG. 7 shows a reference robot path 712. Path 712 is associated with the reference geometric information 706. Since the reference geometric information 706 may not be available, the reference robot path 712 is also shown by dotted lines in FIG. 7. If both the reference robot path 712 the reference geometric information 706 are available, then the generate robot path 708 can calculate an offset for the reference robot path 712. Based on the reference process parameters 710, the reference robot path 712 if available can be updated or a new robot path is generated at 708.

At generate process block 714, the process parameters and the process instructions are generated. The generate process block 714 can if needed use some of the reference process parameters in block 710. The generate robot path 708 and the process parameters and instructions generated at step 714 can be executed in an internal loop so that the robot path and process is optimized. For example, if a process parameter such as the distance from the paint gun 16 to the surface is calculated automatically, then the robot path needs to be updated.

As is shown and described above for the flowcharts 500 and 600 of FIGS. 5 and 6, the robot program generated at step 720 which is the combination of steps 708 and 714, is verified at optional, as shown by the dotted lines, step 716 for quality. For example the optional quality verification asks is the entire path reachable and collision free and for painting can the right amount of paint material be deposited on the part to be painted. If the quality of the robot program is not met, then the robot program is re-generated again at step 720 considering the information provided by the optional quality verification step 716.

If the quality of the robot program is met at the optional verification step 716, then for the painting process described herein the method proceeds to step 718 wherein the method is repeated to scan the next surface segment of the part to be painted. While not shown in FIG. 7 for ease of illustration, there can be in the method 700 two blocks that are identical in function to blocks 514 and 516 described above.

An occurrence of a scanning error in the methods 500, 600 and 700 will while not shown in FIGS. 5 to 7 generate an error.

FIG. 8 shows a flowchart for the method 800 that has a scan surface step 802 and a generate geometric information step 804 that are identical to steps 502 and 504 and 602 and 604, respectively of FIGS. 5 and 6. Method 800 has a step 808 that is as is described below an expanded version of step 608 of FIG. 6.

Step 808 uses the process template 806 to generate the robot path plus instructions such as start/stop etc. To that end, step 808 has two internal steps, namely generate robot path 810 and decide process parameters 812. At step 810 the robot path is generated and at step 812 a decision is made as to which of the robot parameters such as start/stop etc. will be used. As shown in FIG. 8 there is an internal loop between steps 810 and 812 since a change in the parameters to be used may affect the generated path.

The optional "Quality Met?" query at step 814 performs the same function as that performed by the same query in blocks 510, 610 and 716 shown in FIGS. 5, 6 and 7 respectively. If the answer is that the quality has not been met, then the method returns to step 808 so that a new path can be generated. The robot path or the process parameters can be changed. Which is changed depends on the quality check criteria. For example, if there is too much paint sprayed over a surface then the speed is increased.

If the answer is that quality has been met, then the method proceeds to step 816 where since the path and process have both been created at the output of step 808 the robot executes the path and the process.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A system for generating a path to be followed by a robot when said robot is to perform a process on a workpiece, said system comprising:
 a computing device having therein program code for operating said robot and obtaining information related to said workpiece, the computing device further having therein reference geometric information of said workpiece, and wherein said reference geometric information is correlated to a stored robot path to be followed by said robot to perform said process on at least a portion of said workpiece; and
 a vision system for scanning said workpiece to obtain images thereof, said images provided to said computing device,
 wherein said computing device is configured to process said images to obtain geometric information about said workpiece and determine whether said obtained geometric information correlates to said reference geometric information, and
 wherein said computing device is configured to (1) utilize said stored robot path when performing said process on portions of said workpiece in which said obtained geometric information correlates with said reference geometric information, and (2) use, for a portion of said workpiece in which there is a difference between said obtained geometric information and said reference geometric information, the obtained geometric information for that different portion of said workpiece in combination with process related reference parameters stored in said computing device to generate said robot path and robot program process instructions to be followed by said robot to perform said process on the different portion of said workpiece, wherein the process related reference parameters are associated with the particular process to be performed on the workpiece.

2. The system of claim 1 further comprising reference geometric information about said workpiece that is used by said computing device to validate said geometric information about said workpiece obtained by processing said images from said vision system.

3. The system of claim 2 further comprising reference robot path information that is used by said computing device to calculate, when generating said robot path to be followed by said robot in performing said process on said workpiece, an offset for a reference robot path.

4. The system of claim 1 wherein said computing device further includes code configured to verify a generated program code for said robot path and robot program process instructions for quality.

5. The system of claim 1 wherein when said workpiece has two or more surface segments, said process performed on each of said two or more surface segments and said computing device further includes code configured to determine whether the two or more workpiece surface segments have been scanned by said vision system.

6. The system of claim 5 wherein said robot performs said process on said workpiece using said robot path to be followed by said robot to perform said process on said workpiece when said two or more surface segments have been scanned by said vision system.

7. The system of claim 5 wherein said computing device further includes code configured to cause said vision system, when it is determined that not all of said two or more surface segments were scanned by said vision system, to scan a not scanned one of said two or more surface segments.

8. A system for generating a path to be followed by a robot when said robot is to perform a process on a workpiece, said system comprising:
 a computing device having therein program code for operating said robot and obtaining information related to said workpiece; and
 a vision system for scanning said workpiece to obtain images thereof, said images provided to said computing device,
 wherein said computing device is configured to process said images to obtain geometric information about said workpiece and determine whether said obtained geometric information correlates to reference geometric information, said computing device being further configured to (1) use, when said obtained geometric information correlates to the reference geometric information, said obtained geometric information in combination with a process template stored in said computing device to generate said robot path and select motion instructions to be followed by said robot to perform said process on said workpiece, wherein the process template is associated with the particular process to be performed on the workpiece, and (2) use, for a portion of said workpiece in which said obtained geometric information does not correlate to the reference geometric information, the obtained geometric information for said portion of said workpiece in combination with process related reference parameters stored in said computing device to generate said robot path and robot program process instructions to be followed by said robot to perform said process on said portion of said workpiece.

* * * * *